Sept. 24, 1929. G. TASMAN Re. 17,441

JOINT

Original Filed Aug. 26, 1925

INVENTOR.
George Tasman
BY Willis B. Rice
ATTORNEY.

Reissued Sept. 24, 1929 Re. 17,441

UNITED STATES PATENT OFFICE

GEORGE TASMAN, OF BROOKLYN, NEW YORK

JOINT

Original No. 1,619,836, dated March 8, 1927, Serial No. 52,495, filed August 26, 1925. Application for reissue filed January 28, 1929. Serial No. 335,676.

This invention relates to joints and more particularly to the joints between rails, pillars and similar portions of the bodies of vehicles such as automobiles and coaches and of furniture, houses and the like.

An object of this invention is to provide a simple and efficient joint by which rails, pillars and similar devices which may be herein called members may be joined together in a quick, efficient and secure manner without the necessity of the employment of highly trained artisans in the preparation and assembling of the parts.

It is a further object to provide a joint of the character described which may be maintained tight at all times so that any loosening caused by shrinkage of the wood may be taken up.

It is a further object to provide a joint by means of which coach work and cabinet work may be done in a superior manner at very much smaller cost than has heretofore been possible.

The joining of the parts by mortise and tenon is not satisfactory because of the cost of preparation of the parts and because of the weakening of both parts by the material which is cut away.

This invention is particularly applicable to the construction of motor car bodies and for that reason it is here illustrated in that specific application for in that field it becomes increasingly important to reduce the cost of manufacture while improving the appearance of the product and at the same time, particularly in automobiles, the shocks and strains to which the chassis is subjected make it of great importance that the joints be made as strong, firm and permanent as possible.

For a fuller understanding of the nature and objects of the invention reference should be had to the following detailed description taken in connection with the accompanying drawing, in which:—

Figure 1:
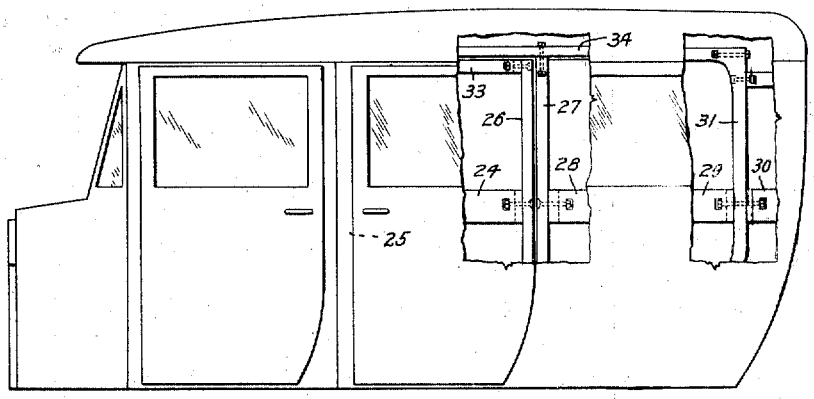
Figure 2:
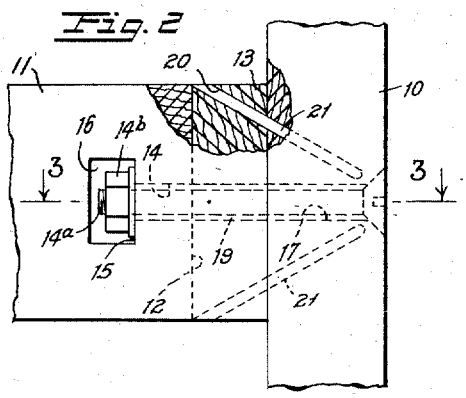
Figure 4:
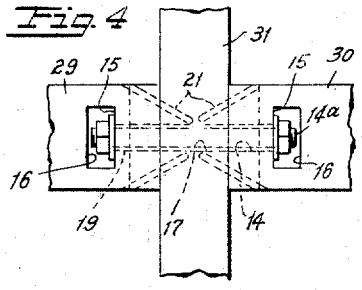
Figure 3:
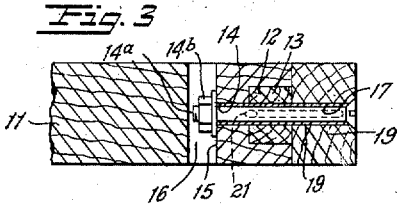
Figure 5:
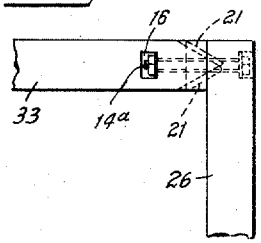
Figure 7:
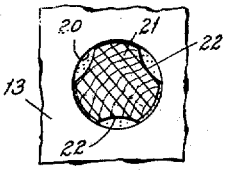
Figure 8:
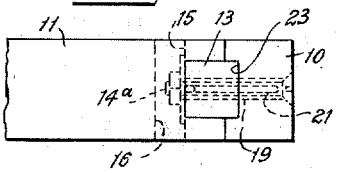
Figure 6:
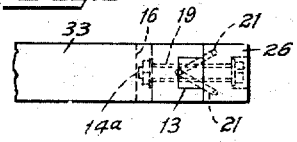

Figure 1 is a side elevation of an automobile body, parts being cut away to more clearly show the applications of the invention. Figure 2 is a view of a joint between a pillar and a rail. Figure 3 is a sectional view of the same on the line 3—3 of Figure 2. Figure 4 is a side elevation of a double joint, in which a rail is joined to each side of a pillar. Figure 5 is a side elevation and Figure 6 is a top view of a modified form of a joint where a narrow rail is employed. Figure 7 is a detailed view of a form of a dowel pin which may be employed. Figure 8 is a modification of the device in which the key is inset slightly into the pillar.

In constructing the joint as illustrated in Figure 2, one of the parts as for example the rail 11 has a vertical channel cut in its end face as shown at 12 preferably from the top to the bottom thereof. This may be done accurately and quickly by machinery and does not require hand labor. A block 13, which I term a key, is cut to fit accurately within the channel 12. This key preferably has its grain running vertically as seen in Figure 2, that is in the direction of the pillar and it is preferably made of wood having a grain similar to that of the pillar as under these conditions the union between the key, the pillar and the rail will be as efficient as possible. This key is firmly glued within the channel.

Where the grain of the key is parallel to that of the pillar a joint is provided between the rail, the key and the pillar having extensive glued surfaces with side grain gluing which afford far greater strength than where end grain gluing must be relied upon to stand the strain.

Means are provided extending through the pillar 10 in the direction of the extension of the rail 11, for drawing the parts together, taking the strain of the joint. For this purpose a bolt may be employed. As shown, there is cut through the key 13 in the direction of extension of the rail 11, a bore 14 adapted to receive a bolt. In the form of the invention here illustrated the key 13 terminates flush with the upper and lower surface of the rail and the bore 14 into the key is within the confines of the rail itself. Where this form of the invention is employed there is provided upon the interior of the rail an inner face 15 transverse to the bore 14 against which a nut and washer may bear and in order to provide this face and permit the insertion of the nut within it an opening 16 is cut through from one face of the rail in registry with the bore having the face 15 as one of its boundries. This face 15 may be the inner face of the key 13 as shown in the Figure 8 or it may be spaced back from the key 13 as shown in Figures 3 and 4. The former is the more suitable where the bolt is disposed without the confines of the rail.

A bore 17 is cut through the pillar 10 in position to be in registry with the bore 14 when the parts are in their relative position. With such a joint as here contemplated it is particularly desirable to provide some means to take the shearing strain of the joint and to stiffen it against bending and it is desirable to provide such means in addition to the insertion of a bolt to connect the parts together as it is difficult to maintain a tight contact between the surface of the bolt and the inner surface of the bored hole, to the extent which is desirable. It is preferable, therefore, to cut the bores 14 and 17 of sufficient size to permit a tubular sleeve 19 to be driven in, this sleeve itself having an interior of such a diameter as firmly to receive the bolt 14[a].

To assemble the parts, the rail being already prepared as described, a good grade of glue is smeared over the end of the rail and the adjacent side of the pillar and they are then brought together in position. The tube 19 is then driven into place. Thereafter the bolt 14[a] is inserted and engaged with its nut 14[b] and is tightened up. This draws the parts firmly together taking the strain from the glue during the setting operation and taking the greater portion of the strain of the joint during use. With a joint such as here described it will be readily seen that should the joint become loosened by the breaking of the glue between the key and the pillar, as for example by shrinking of the wood, the joint may be restored by slightly loosening the parts to permit the insertion of new glue and retightening the bolt. If desired, holes 20 may be bored from the rail into the pillar at sharp angles as for example about 30 degrees and into these holes may be fit dowel pins 21. These pins assist in taking the shearing strain of the joint in holding the parts together.

I preferably employ dowel pins such as are illustrated in Figure 7 having grooves or channels 22 cut longitudinally thereof. Such a dowel pin facilitates assembling because the holes 20 may be substantially filled with glue and the dowel pins driven into place; the channels offering means of exit for the surplus glue, at the same time causing the glue to squeeze out and fill the pores of the wood so as to bring a very good union between the pins and the walls of the adjoining parts.

In some cases I may prefer to extend the key 13 beyond the butting face of the rail as shown in Figure 8 and provide a perpendicularly disposed shallow recess 23 in the pillar complementary to and adapted to mate with the extending key. The parts are thoroughly glued and assembled in the manner previously described.

As illustrations of where the joint may be applied there is shown in Figure 1 a shell of the automobile body broken away to show the joint as applied to the doors, this joint being used in connecting the horizontal rails 24 with the pillars 25 and 26 and for connecting the pillar 27 with the belt rail 28.

The modification of the invention illustrated in Figure 4 shows two rails connected to a single pillar. In this instance both of the rails 29 and 30 are provided with openings 16 for the reception of nuts and a single bore connects these two openings through the pillar. In this instance a stud threaded at both ends may be employed in place of a bolt and a nut may be applied at each end of it in the respective openings 16. A joint of this type may be employed in the body as shown in Figure 1 to connect the quarter belt rail 29 and the back corner belt rail 30 to a quarter pillar 31.

When joining a rail and pillar which are so narrow that the openings 16 are too small to permit the use of a wrench to turn the nut, as for instance where the top rail of a door is joined to the pillar at either end, the opening 16 may be made only large enough to slide the nut into it into registry with the bore 14. In such an instance a bolt having a slotted head may be used so that it may be tightened by a screw driver. Under such circumstances I prefer to insert the dowels 21 crosswise to each other as illustrated in Figure 6.

The joint between the top rail 34 and the pillar 27 may be similar to that between the top rail 33 and pillar 26 except that in the former case it may not be desirable to employ a bolt with a slotted head.

It is understood that this invention is applicable to the joint of elements such as rails and pillars whether made of wood or wood substitutes or other materials which may be similarly cut, shaped and joined. It will be also understood that many changes in the construction may be made without departing from the scope of the invention, within the meaning of the claims. For instance a plurality of channels may be cut in the end face of the rails and a plurality of keys may be inserted in place of one, and the rails may be joined to the pillars at oblique angles instead of a right angle as shown in the drawings. Also when desired the openings 16 can be made a part of the channel for the key 13 so that a single operation is sufficient to make both. Moreover the bolt extending through the key may be out of alinement with the rail itself, when desired, as for example in joining two adjacent and parallel rails to a single pillar. The two rails may be channeled in alinement and joined to a common key and the composite rail so formed may be glued to the pillar and retained in place by a bolt in alinement with the space between the rails, whereby the back face of the key serves as the face 15 against which the nut bears and the nut may rest between the rails without the necessity of forming an opening 16 in the rail.

The above invention produces a body which will withstand great strain and which may be manufactured with a minimum of skilled labor. Moreover the bolt can be kept at such a tension that it takes the strain of the joint thereby obviating the tendency of the glue to become broken.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the general and specific features of the invention herein described, and all statements of the scope of the invention which, as a matter of language, might be said to fall therebetween.

Having described my invention, what I claim as new and desire to secure by Letters Patent, is:—

1. A joint between two elements such as a pillar and a rail including a threaded member extending through a bore in one of said parts into the other for holding the parts together and a sleeve surrounding said member and forming a tight fit in both said parts at the butting surface to hold the parts against shearing and bending strains.

2. A joint between a pillar and a rail comprising a key having its grain parallel to the grain of the pillar inset into the butting end of the rail and abutting against the side of the pillar and means including a threaded member extending through said pillar, to engage said key to draw said parts together.

3. A joint between a pillar and a rail comprising a key inset into the butting end of the rail and abutting against the side of the pillar and means including a threaded member extending through said pillar into said key, to draw said parts together and a sleeve surrounding said threaded member, forming a tight fit within said pillar and said key at the butting surface to take the shearing and bending strain.

4. A joint between a pillar and a rail comprising in combination a bolt extending through said pillar into said rail parallel to the direction of extension of said rail, a nut concealed within said rail adapted to cooperate with said bolt and means for distributing the pressure exerted by said nut throughout the height of the rail.

5. A joint between a pillar and a rail comprising in combination a groove cut in the butting end of the rail parallel to the direction of extension of the pillar, a key accurately fitting within and glued within said groove, a bolt parallel to said rail and extending through said pillar and said key and a nut beyond said key in position to cooperate with said bolt to hold the parts together.

6. A joint between a pillar and a rail comprising in combination a sleeve extending through said pillar into said rail parallel to the direction of extension of said rail and fitting tightly within said members, a bolt extending through said sleeve to draw the parts together.

7. A joint between a pillar and a rail comprising in combination a sleeve extending through said pillar into said rail parallel to the direction of extension of said rail and fitting tightly within said members, a bolt extending through said sleeve to draw the parts together and a positioning member fitting tightly within an orifice extending through both said members transverse to the abutting faces to take shearing and bending strains.

8. A joint between a wooden pillar and a wooden rail, said joint comprising a pillar, a rail furcated at its end facing aforesaid pillar, a key, arranged within and glued to the aforesaid furcated end and into a recess in the pillar, having its grain running in the same direction as that of the pillar, an aperture spacious enough to operate the nut of a bolt therein, arranged in the rail in a short distance from its furcated end, a channel, bored through the pillar and extended in a longitudinally central direction through the key until it connects with the aforesaid aperture, a tube within and fitting tightly into aforesaid channel, a bolt arranged in aforesaid tube projecting with its screw-threaded end into aforesaid aperture, a washer and a nut tightened on the threaded end of said bolt, holes in an oblique direction through the rail and the key into the pillar, and a grooved pin glued within and filling each of aforesaid holes.

9. A joint between a wooden pillar and a wooden rail, said joint comprising a pillar, a rail furcated at its end facing the pillar, a key arranged within and glued to the aforesaid furcated end with its grain running in the same direction as that of the pillar, an aperture, spacious enough to operate a nut of a bolt therein, arranged in the rail in a short distance from its furcated end, a channel bored through the pillar and extended in a longitudinally central direction through the key until it connects with aforesaid aperture, a tube within and fitting tightly into aforesaid channel, a flat headed bolt, arranged in said tube, projecting with its screw-threaded end into aforesaid aperture, a washer and a nut tightened on the threaded end of said bolt, holes arranged in an oblique direction on the upper and lower side of the rail passing from the same through the key into the pillar, and a grooved pin glued within and filling each of aforesaid holes.

10. In a bolted joint between a pillar and a rail adhering together by means of a key arranged within the furcated end of the rail so as to have its grain in the same direction as that of the pillar, the combination comprising a bolt passing through a channel in the pillar, the rail and the key substantially equidistantly from the upper and lower side of the rail and projecting into an aperture, spacious enough to handle a nut therein, in the side of the said rail, a metal tube, of slightly smaller length than the channel, fitted in tightly between the shank of the bolt and the walls of the channel, and a nut engaging the threaded end of the bolt.

11. In a joint between a pillar and a rail glued together by a key arranged within the furcated end of the rail and tightened by a bolt arranged within the pillar and the rail, a plurality of pins leading in an oblique direction from the rail through the key into the pin and being secured in aforesaid members.

12. A joint between two elements such as a pillar and a rail, one having an end grain adapted to butt against the side grain of the other including a key inset into said first mentioned member and having its grain parallel to the grain of said second mentioned member.

13. A joint between two elements such as a pillar and a rail, one having an end grain adapted to butt against the side grain of the other including a key inset into said first mentioned member and having its grain parallel to the grain of said second mentioned member and means transverse to the butting surface between said elements for taking the shearing and bending strain.

GEORGE TASMAN.